(12) United States Patent
Yokoyama et al.

(10) Patent No.: US 6,725,832 B2
(45) Date of Patent: Apr. 27, 2004

(54) EGR CONTROL APPARATUS FOR INTERNAL COMBUSTION ENGINE

(75) Inventors: Jin Yokoyama, Fujisawa (JP); Yutaka Uematsu, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/303,533

(22) Filed: Nov. 25, 2002

(65) Prior Publication Data

US 2003/0098014 A1 May 29, 2003

(30) Foreign Application Priority Data

Nov. 29, 2001 (JP) ......................... 2001-364638

(51) Int. Cl.[7] .................. F02M 25/07; F02D 11/10; F02D 21/08
(52) U.S. Cl. .................. 123/396; 123/399; 123/568.19; 123/568.21
(58) Field of Search ................. 123/396, 399, 123/403, 568.11, 568.12, 568.19, 568.2, 568.21, 568.23, 568.26, 568.27

(56) References Cited

U.S. PATENT DOCUMENTS

| | | | | |
|---|---|---|---|---|
| 6,039,025 A | * | 3/2000 | Iwano et al. | ............. 123/399 |
| 6,079,387 A | * | 6/2000 | Mamiya et al. | ............. 123/399 |
| 6,289,883 B1 | * | 9/2001 | Wakutani et al. | ...... 123/568.21 |

FOREIGN PATENT DOCUMENTS

| | | |
|---|---|---|
| JP | 07-004319 | 1/1995 |
| JP | 08-158953 | 6/1996 |
| JP | 08-210195 | 8/1996 |
| JP | 09-079091 | 3/1997 |
| JP | 11-013511 | 1/1999 |

* cited by examiner

Primary Examiner—Willis R. Wolfe
(74) Attorney, Agent, or Firm—McCormick, Paulding & Huber LLP

(57) ABSTRACT

Adequate controllability is ensured when feedback control is provided to both the EGR valve and the intake throttle valve, and switching shock is prevented when control is switched from one to the other. The present apparatus comprises an EGR valve, an intake throttle valve, feedback control means for providing feedback control to the EGR valve and intake throttle valve such that the actual EGR volume approximates the target EGR volume corresponding to the running condition of the engine, and limiting means for limiting the operable opening ranges of the EGR valve and intake throttle valve in accordance with the target EGR volume. During EGR control of one valve, feedback control is provided to the other valve and the target opening is constantly calculated. The actual operations are merely limited, so these operations can start from the optimal opening and the switching shock can be prevented when a switch is made to the control of the other valve.

21 Claims, 6 Drawing Sheets

FIG. 5

EGR CONTROL APPARATUS FOR INTERNAL COMBUSTION ENGINE

CROSS REFERENCE TO RELATED APPLICATIONS

This application is entitled to the benefit of and incorporates by reference essential subject matter disclosed in Japanese Patent Application No. 2001-364638 filed Nov. 29, 2001.

BACKGROUND OF THE INVENTION

1. Field of the Invention

The present invention relates to an EGR (exhaust gas recirculation) control apparatus for an internal combustion engine, and more particularly to controlling the EGR volume (or EGR rate; same below) by means of an EGR valve and an intake throttle valve.

2. Description of the Related Art

In general, the EGR control in diesel engines controls the EGR volume by controlling the opening of the EGR valve such that the actual EGR volume reaches the target EGR volume corresponding to the running condition of the engine. If the EGR volume is insufficient even when the EGR valve is fully opened, an intake throttle valve is further provided, the intake is throttled in the insufficient region (primarily the low load region of the engine), and the EGR volume is increased.

The value of the intake air volume (new air volume) is generally used as an alternative value to the value of the EGR volume. More specifically, the total intake air volume entering the cylinder is the sum of the intake air volume comprising the new air and the EGR gas volume (EGR volume), and the total in-cylinder intake air volume is substantially constant if the air intake mass or the like. (e.g., boost pressure) is fixed; therefore, controlling the intake air volume makes it possible to control the EGR volume.

When feedback control is conducted for both the EGR valve and the intake throttle valve so that a match with the target EGR volume (or target intake air volume) is established, neither valve can be controlled with correlation or coordination, the valves end up operating arbitrarily, and proper control cannot be achieved. More specifically, the openings of both valves cannot be uniquely determined in relation to a single target value, and control that differs from intended control (for example, both valves close simultaneously) occurs. Therefore, it is believed that feedback control must be provided to one of the valves, and open-loop control must be provided to the other valve.

FIGS. 8 and 9 display examples of conventional control. Displayed herein are examples in which feedback control is provided to the EGR valve, and open-loop control is provided to the intake throttle valve. The value of the EGR volume replaces the value of the intake air (new air) mass, namely, the air mass volume. Duty control is provided to the EGR valve and intake throttle valve, and the opening is changed in accordance with the duty (duty value) of the given duty signal. FIG. 8 illustrates control of the EGR valve, and FIG. 9 illustrates control of the intake throttle valve.

As is shown in FIG. 8, the actual engine speed Ne, fuel injection volume Q, and air mass volume Ga are first read (step 801). During this process, the target air mass volume Gat is calculated in accordance with the map M81 on the basis of the engine speed Ne and fuel injection volume Q (step 802). The map M81 predetermines the relationship between the engine speed Ne or fuel injection volume Q and the air-fuel ratio A/F, and the target air mass volume is calculated from the obtained air-fuel ratio A/F. Next, the deviation between the target air mass volume Gat and the actual air mass volume Ga detected using an air mass sensor is calculated ($\Delta Ga = Gat - Ga$) (step 803). Based on the deviation $\Delta Ga$, the proportional gain GP and integral gain GI are calculated from the map (step 804). The drawing displays only the calculation map M82 of the proportional gain GP. Based on this map M82, a high proportional gain GP is incrementally assigned as the deviation $\Delta Ga$ increases. Next, the duty D assigned to the EGR valve is calculated with the aid of the formula $D = C(GP + GI)$ by using the proportional gain GP and the integral gain GI (step 805). C is a specific constant. The actual air mass volume is brought closer to the target air mass volume, and, as a result, the actual EGR volume is brought closer to the target EGR volume by repeating this process flow at specific time intervals.

During the control of the intake throttle valve shown in FIG. 9, the actual engine speed Ne and fuel injection volume Q are read (step 901), and, based on these values, the target valve duty D assigned to the intake throttle valve from the map M91 is calculated (step 902). As the engine speed Ne or fuel injection volume Q increases, the value of the target valve duty D increases on the open side. In this way, the duty assigned to the intake throttle valve is determined without any consideration given to the actual value.

If, however, feedback control is provided only to the EGR valve, and open-loop control is provided to the intake throttle valve in this manner, the tracking of the intake throttle valve becomes poor and controllability suffers when EGR control is provided only to the intake throttle valve in the low-load region of the engine, particularly during excessive operation. Specifically, no feedback of the actual air mass volume is provided, so a discrepancy between the target value and actual value occurs.

Feedback control of both valves is thus preferred, but merely adopting this approach will create a problem of poor controllability because of the uncorrelated control of the two valves, as mentioned above.

In conventional practice, a technique in which feedback control is provided to both valves, control of the EGR valve is stopped (EGR valve OFF) when the EGR valve is nearly fully opened, and the system is switched to control based on the intake throttle valve (intake throttle valve ON) is used in order to address the aforementioned problems. During this simple control switching process, however, the intake throttle valve suddenly moves the moment the system is switched to control based on the intake throttle valve, creating a torque shock from the switch.

SUMMARY OF THE INVENTION

With the foregoing problems in view, it is an object of the present invention to ensure adequate controllability and to prevent a switching shock from occurring when one type of control is switched to another in cases in which feedback control is provided to both the EGR valve and the intake vale with regard to EGR control.

The invention of claim 1 is an EGR control apparatus for an internal combustion engine comprising an EGR valve provided to an EGR duct for connecting the intake duct and exhaust duct of an engine; an intake throttle valve provided to the intake duct; feedback control means for providing feedback control to the EGR valve and intake throttle valve such that the actual EGR volume approximates the target EGR volume corresponding to the running condition of the engine; and limiting means for limiting the operable opening ranges of the EGR valve and intake throttle valve in accordance with the target EGR volume.

The invention of claim 2 is the invention according to claim 1 in which the limiting means imposes restrictions so that the openings of the EGR valve and intake throttle valve are variable within specific opening ranges when the target EGR volume falls within a specific range.

The invention of claim 3 is the invention according to claims 1 or 2 in which the limiting means limits the operable opening range of either the EGR valve or the intake throttle valve in accordance with the target opening of the other valve obtained by the feedback.

The invention of claim 4 is the invention according to claim 3 in which the limiting means determines the operable opening ranges of the EGR valve and intake throttle valve in accordance with specific maps.

The invention of claim 5 is the invention according to claims 3 or 4 in which the limiting means imposes restrictions so that the EGR valve remains fully opened when the target opening of the intake throttle valve is equal to or less than a first opening, the EGR valve is operable from the point where the valve is fully opened to the opening where the valve closes as the target opening increases when the target opening is greater than the first opening but is equal to or less than a second opening, and the EGR valve is operable from the point where the valve is fully opened to the point where the valve is fully closed when the target opening is greater than the second opening. The limiting means also imposes restrictions so that the intake throttle valve remains fully opened when the target opening of the EGR valve is equal to or less than a third opening, the intake throttle valve is operable from the point where the intake throttle valve is fully opened to the opening where the intake throttle valve closes as the target opening increases when the target opening is greater than the third opening but is equal to or less than a fourth opening, and the intake throttle valve is operable from the point where the valve is fully opened to the point where the valve is fully closed when the target opening is greater than the fourth opening.

The invention of claim 6 is the invention according to any of claims 1 to 5 in which the value of the EGR volume is replaced with the value of the intake air volume entering the intake duct, a means of detecting the intake air volume is provided in the intake duct for the purpose of detecting the actual intake air volume, and the feedback control means determines the target opening of the EGR valve and intake throttle valve on the basis of the deviation between the actual intake air volume and the target intake air volume.

The invention of claim 7 is the invention according to any of claims 1 to 6 in which duty control is provided to the EGR valve and intake throttle valve, and the openings of the EGR valve and intake throttle valve are replaced with the duty values of the duty signals assigned thereto.

The invention of claim 8 comprises an EGR valve provided to an EGR duct for connecting the intake duct and exhaust duct of an engine; an intake throttle valve and air mass sensor provided in the intake duct; feedback control means for providing feedback control to the EGR valve and intake throttle valve such that the actual air mass volume detected with the air mass sensor approximates a predetermined target air mass volume in accordance with the running condition of the engine; and valve opening limiting means wherein the range of the duty assigned to either the EGR valve or the intake throttle valve is limited by means of a target duty that corresponds to the other valve and is obtained by the feedback, and restrictions are imposed whereby the openings of the EGR valve and intake throttle valve can be varied within specific ranges with regard to specific regions in which the valves are fully opened.

The invention of claim 9 is an EGR control method for an internal combustion engine in which both an EGR valve provided in an EGR duct communicating with the intake duct of the engine and an intake throttle valve provided in the intake duct undergo feedback control such that the actual EGR volume approximates the target EGR volume corresponding to the running condition of the engine, wherein the operable opening range of one of the EGR valve and the intake throttle valve is mutually limited in accordance with the target opening of the other valve obtained by the feedback.

The invention of claim 10 is the invention according to claim 9 in which the openings of the EGR valve and intake throttle valve can be varied within specific ranges when the target EGR volume falls within a specific range.

BRIEF DESCRIPTION OF THE DRAWINGS

FIG. 5 is a flowchart depicting details of EGR control provided by the present apparatus;

DESCRIPTION OF THE PREFERRED EMBODIMENTS

Preferred embodiments of the present invention will now be described with reference to the accompanying drawings.

Figure 1:
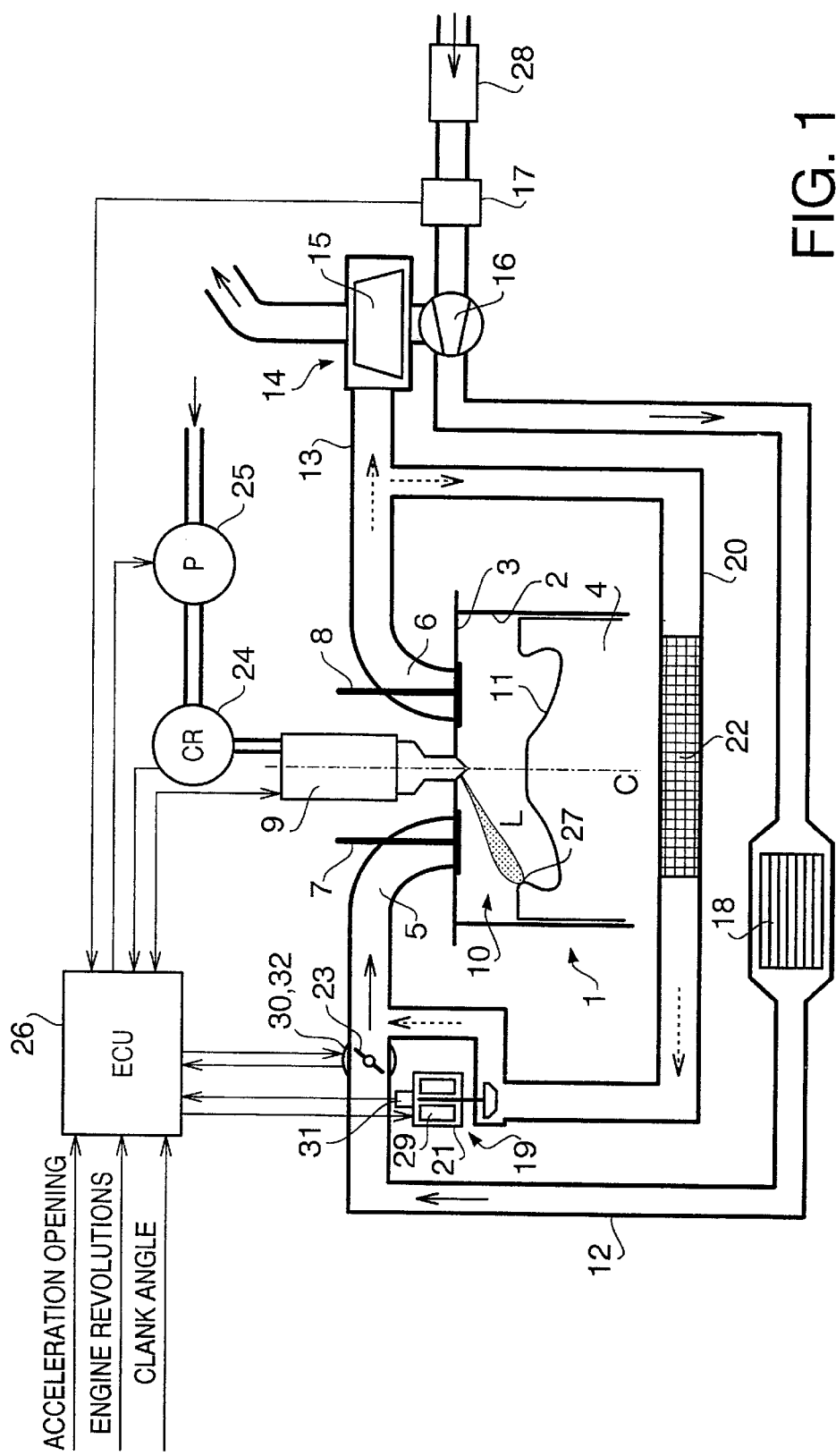
FIG. 1 is a system diagram depicting an engine that pertains to an embodiment of the present invention.

FIG. 1 depicts an internal combustion engine pertaining to the present embodiment. The internal combustion engine is a diesel engine, and in particular, the present embodiment is a common rail diesel engine comprising a common rail fuel injection apparatus. This engine is designed for use in automobiles.

1 is an engine body. The body comprises a cylinder 2, a cylinder head 3, a piston 4, an intake port 5, an exhaust port 6, an intake valve 7, an exhaust valve 8, and an injector 9, which acts as a fuel injection valve. A combustion chamber 10 is formed inside the cylinder 2 and fuel is injected from the injector 9 to the combustion chamber 10. A cavity 11 is formed on top of the piston 4, and this cavity 11 is part of the combustion chamber 10. The cavity 11 is in the shape of a re-entrant combustion chamber raised in the central portion of the bottom. The fuel injected from the injector 9 constantly reaches the cavity 11. The injector 9 is positioned substantially concentrically with the cylinder 2 and is used to inject fuel from multiple injection holes simultaneously in a radial pattern. The angle formed by each portion of fuel mist L and the cylinder core C is remains the same at all times.

The intake port 5 is connected to an intake tube 12, and the exhaust port 6 is connected to an exhaust tube 13. The intake port 5 and intake tube 12 form an intake duct, and the exhaust port 6 and exhaust tube 13 form an exhaust duct. This engine is provided with a turbocharger 14, which turbocharges the intake air by using the exhaust energy. 15 is a turbine and 16 is a compressor. A means of detecting the intake air volume is provided upstream from the compressor 16 for the purpose of detecting the actual intake air volume (new air volume) in the intake duct. The means of detecting the intake air volume comprises an air mass sensor 17 for the purpose of detecting the mass of the intake air. An air cleaner 28 is provided upstream from the air mass sensor 17. An intercooler 18 is provided downstream from the compressor 16 for the purpose of cooling the intake air. As shown here, the present embodiment is a turbocharged engine; however, the present invention may also be effective in a natural intake air engine without a turbocharger.

This engine is also equipped with an EGR apparatus 19. The EGR apparatus 19 comprises an EGR tube 20 for connecting the intake tube 12 and the exhaust tube 13 (this forms the EGR duct), an EGR valve 21 provided in the midportion of the EGR tube 20 and designed to adjust the EGR volume, and an EGR cooler 22 for cooling the EGR gas upstream from the EGR valve 21. An intake throttle valve 23 for throttling the intake air in an appropriate manner is provided upstream from the connection with the EGR tube 20 in the intake tube 12.

The injector 9 is connected to a common rail 24, and fuel (20–200 MPa) whose high pressure is equivalent to the injection pressure and which is stored in the common rail 24 is constantly supplied to the injector 9. Fuel pumped under pressure by a high-pressure pump 25 is supplied to the common rail 24.

An electronic control unit 26 (hereafter referred to as "ECU") is provided for the purpose of electronically controlling the engine. In the ECU 26, the actual running condition of the engine is detected by several types of sensors, and the injector 9, the EGR valve 21, the intake throttle valve 23, and a metering valve (not shown) for adjusting the fuel pressure volume from the high-pressure pump 25 are controlled based on the running condition of the engine. The abovementioned sensors include the air mass sensor 17 as well as an accelerator opening sensor, engine revolution sensor, and common-rail pressure sensor (none of which are shown). The actual intake air volume, accelerator opening, engine speed (revolutions), engine crank angle, and common-rail pressure are detected by means of the ECU 26.

The injector 9 has a magnetic solenoid that can be turned on and off by the ECU 26. When the magnetic solenoid is turned on, an open state is established and fuel is injected. When the magnetic solenoid is turned off, a closed state is established and the fuel injection stops. The ECU 26 determines the target fuel injection volume and target fuel injection timing primarily from the engine speed and the acceleration opening. At the same time as the target timing is actually reached, the magnetic solenoid is turned on only for the time corresponding to the target fuel injection volume. The greater the target fuel injection volume, the longer the ON period.

The ECU 26 also determines the target common-rail pressure in accordance with the running condition of the engine. Feedback control of the common-rail pressure is provided so that the actual common-rail pressure approximates the target common-rail pressure.

The ECU 26 provides feedback control to the EGR valve 21 and intake throttle valve 23 on the basis of the air mass volume. Feedback may be provided based on the EGR volume, but because the EGR volume is difficult to measure and the air mass volume is easier to measure, the air mass volume is used as an alternative value of the EGR volume. The feedback control method will be explained in detail later. The ECU 26 also provides duty control to the EGR valve 21 and intake throttle valve 23. Electrical actuators 29 and 30 are provided in the EGR valve 21 and intake throttle valve 23 for driving the valves in an openable and closable manner. The openings of the EGR valve 21 and intake throttle valve 23 change in accordance with the duty (ON duty value) assigned to the electrical actuators 29 and 30. Opening sensors 31 and 32 are provided in the EGR valve 21 and intake throttle valve 23 for the purpose of detecting the actual openings of the valves. Opening signals are provided to the ECU 26, and the two valve openings can be recognized by the ECU 26.

The EGR control method for the engine will now be explained.

Figure 2:
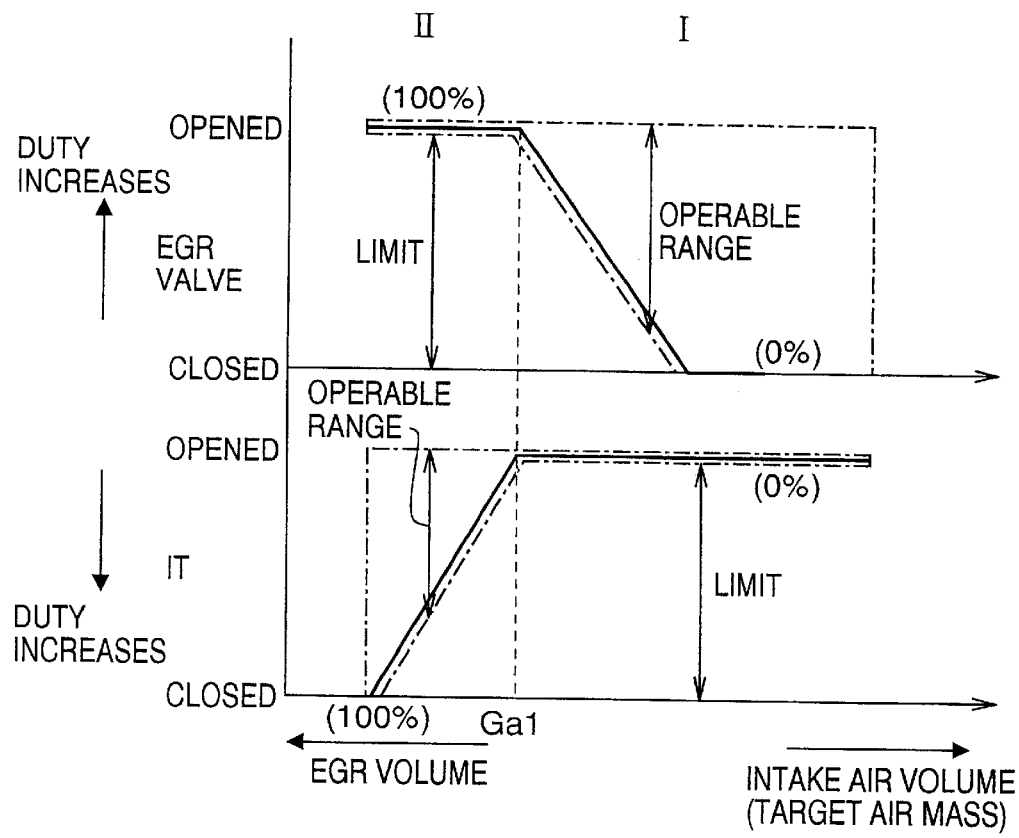
FIG. 2 is a graph depicting basic information about EGR control provided by the present apparatus.

FIG. 2 shows the details of EGR control, which is the objective of the present apparatus. The intake air volume (new air volume) is plotted on the horizontal axis and may be regarded as the target air mass volume used in feedback. The intake air volume increases in the direction to the right. Conversely, the intake air volume decreases in the direction to the left, increasing the EGR volume. The load may also be considered to increase in the direction to the right during actual engine operation.

The vertical axis represents the EGR valve opening on the top half of the graph and the intake throttle valve (IT) opening on the bottom half of the graph. On the top half of the graph, as the given duty increases, the opening of the EGR valve 21 also increases. Conversely, on the bottom half of the graph, as the given duty increases, the opening of the intake throttle valve 23 decreases. This is because when the engine is stopped, namely, when both valves are off, it is desirable that the EGR valve 21 be fully closed and the intake throttle valve 23 be fully opened because of considerations related to engine startability and the like.

For the specific value Gal of the intake air volume shown by the dotted line, EGR control is provided solely on the basis of the EGR valve 21 in region I, where the intake air volume is high. In region II, where the intake air volume is low, EGR control is provided solely on the basis of the intake throttle valve 23. Region II may be regarded as a low-load region. In region I, as shown by a solid line, the EGR valve 21 is gradually closed as the intake air volume increases while the intake throttle valve 23 remains fully opened and the intake air resistance is kept at a minimum. When the intake air volume exceeds a constant value, the EGR valve 21 becomes fully closed. This is because EGR at a high load is connected to a decrease in output and an increase in smoke.

Conversely, in region II, where the EGR volume is insufficient even when the EGR valve 21 is fully opened, the intake throttle valve 23 is gradually closed as the intake air volume decreases while the EGR valve 21 remains fully opened. In region II, which is commonly a low-load region for the engine, a large differential pressure between the exhaust pressure and intake pressure cannot be maintained, and duct resistance exists in the EGR duct; therefore, a large EGR volume cannot be achieved even when the EGR valve is fully opened. But a differential pressure can be maintained and a large EGR volume achieved by throttling the intake air in the manner described above.

Feedback control is provided herein to both the EGR valve 21 and intake throttle valve 23, and when one of these valves is merely turned on while the other valve is turned off when the specific value Ga1 of the intake air volume is reached (for example, the moment control is switched from the EGR valve 21 to the intake throttle valve 23), the intake throttle valve 23 suddenly moves and a switching shock is created. This is the result of the fact that in the event the intake air volume is low at the time of low revolutions, low load, or the like, a dead zone with no change in the intake air volume exists even if the fully opened intake throttle valve 23 closes when control shifts to the intake throttle. Therefore, at this time, the values of the proportional gain and integral gain rapidly increase and control is generated to attempt to suddenly throttle the intake air. The same problem also occurs when control is switched in the opposite direction.

In the present apparatus, however, the operable opening ranges of the EGR valve 21 and intake throttle valve 23 are limited in accordance with the intake air volume. More specifically, limits are imposed on the control such that the actual valve openings can assume only the values required for control, namely, the values within the dashed lines.

When this occurs (for example, when feedback control is being provided based on the EGR valve 21 in region I), feedback control is provided to the intake throttle valve 23, and the target opening of the intake throttle valve 23 (more specifically, the target duty to be explained later) is constantly calculated. The actual opening is fixed to remain fully open merely by introducing control restrictions. When control is switched (shifted) from the EGR valve 21 to the intake throttle valve 23 by means of the aforementioned procedure, the intake throttle valve 23 thus begins operating from an optimum target opening calculated in advance, making it possible to prevent a switching shock.

Figure 3:
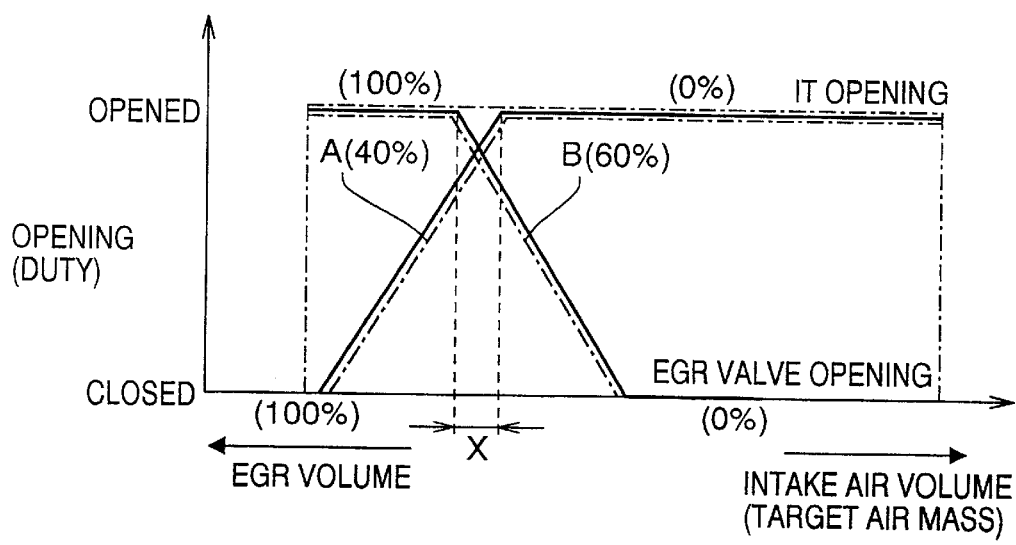
FIG. 3 is a graph depicting specific details of EGR control provided by the present apparatus.

As shown in FIG. 3, the present apparatus is adapted to further prevent switching shock by the following method. More specifically, in the example in FIG. 2, when control is switched at the value Ga1 of the intake air volume and the opening of one valve is gradually increased to a fully open state, control is then switched to the other valve. In contrast to this, in the example shown in the drawing, the openings of both valves can vary across a constant range within a limited range when the intake air volume falls within a specific range X in the vicinity of the switching point, and before one valve is gradually opened to the fully open state, control is allowed for the other valve. This is to say, within the range X, both valves can be freely operated in accordance with the target values obtained from the feedback control within a limited range. The graph in FIG. 3 is a combination of the top and bottom graphs in FIG. 2, with the graph of the EGR valve 21 moved to the left and the graph of the intake throttle valve 23 moved to the right to form an overlapping region X in which the openings of both valves can be changed.

When a region is provided so that both openings can be varied, both valves can be moved freely without any unintended movements, the shifting of control to the EGR valve 21 or intake throttle valve 23 becomes smooth, and the switching shock can be further prevented. Furthermore, feedback control can be provided to the EGR valve 21 and intake throttle valve 23 without any problems by allowing free movement of both valves within the region X (in which the valves do not affect one other) and gradually restricting one valve while shifting operations to the other valve.

The above limits are imposed in accordance with a map created in advance during actual control. With regards to creating the map, there is a method for determining the variable range (or limited range) of the valve openings in accordance with the target intake air volume (that is, target air mass volume). This method, however, requires time to make the necessary calibrations for both valves, and the two must be adjusted. In view of this, the operable opening range of one valve is determined with respect to the opening of the other valve in the present embodiment. More specifically, the operable opening range of one valve is limited in accordance with the opening of the other valve. This process enables a significant reduction of the calibration time. For example, when the opening of the EGR valve 21 gradually increases and reaches a fixed value just before becoming fully opened, it is as if the variable opening of the intake throttle valve 23 is allowed to move within a small range from the position of being fully opened.

Figure 4A:
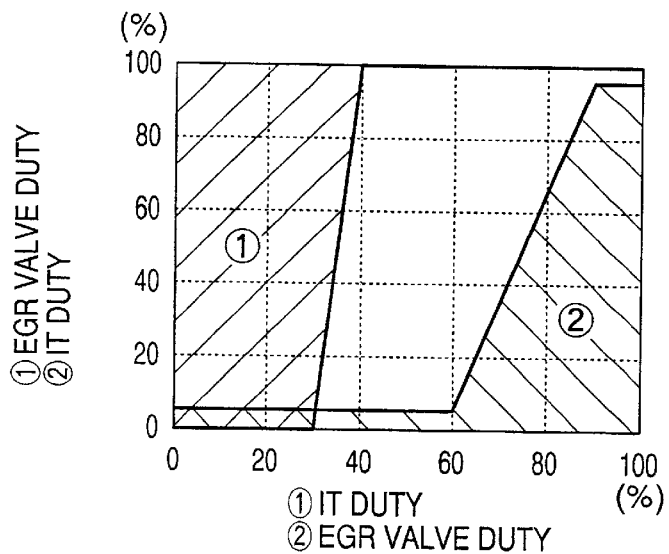
FIGS. 4a–4c are opening limit maps for the EGR valve and intake throttle valve.
Figure 4B:
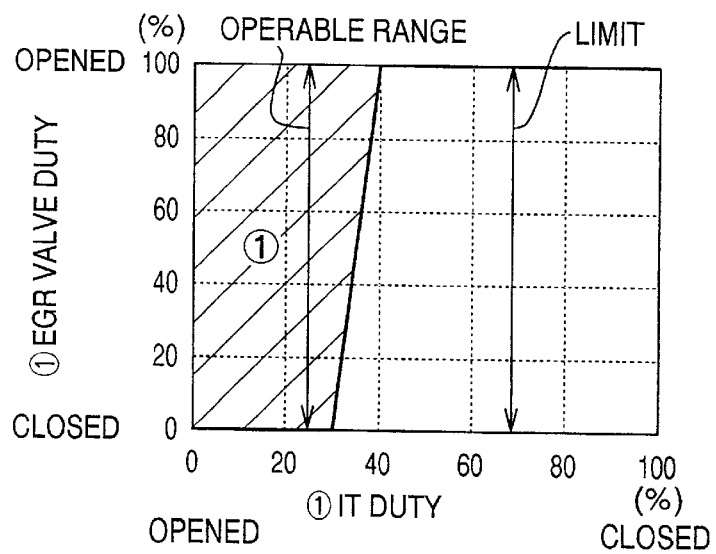
Figure 4C:
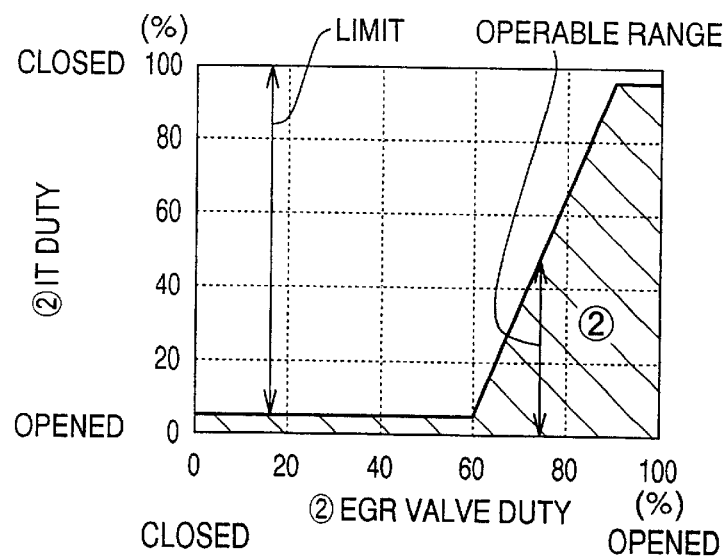

FIGS. 4a to 4c are maps created based on the above concepts. In these maps, the duties assigned to the valves are used as the alternative values of the openings of the EGR valve 21 and intake throttle valve 23. As mentioned above, as the duty for the EGR valve 21 increases, the valve opens, and conversely, as the duty for the intake throttle valve 23 increases, the valve closes.

FIG. 4a shows the opening range limit maps for both valves, and FIGS. 4b and 4c show the maps in FIG. 4a resolved for each valve. FIG. 4b shows the map for the EGR valve 21, and FIG. 4c shown the map for the intake throttle valve 23. In FIG. 4a, (1) is related to the EGR valve 21, and (2) is related to the intake throttle valve 23.

In the opening range limit maps for the EGR valve 21, the duty for the intake throttle valve 23 (IT duty) is plotted on the horizontal axis, and the duty for the EGR valve 21 (EGR duty) is plotted on the vertical axis, as shown in FIGS. 4a and 4b. The EGR valve duty is limited to the values that fall within the range shown by the diagonal lines in the graphs in relation to the IT duty. In other words, the values outside of that range are restricted. Thus, the operable opening range of the EGR valve 21 is limited in accordance with the opening of the intake throttle valve 23.

When the intake throttle valve 23 is closed at an IT duty of 40% or higher (which corresponds to the first opening of the present invention), the EGR valve duty is limited to 100%; that is, the valve is fully opened. This corresponds to a situation in which point A in FIG. 3 has an IT duty of 40%. Conversely, the limit is gradually eased at the stage in which the IT duty decreases from 40% to 30% (which corresponds to the second opening of the present invention). The range of obtainable EGR valve duty proportionally increases, and the EGR valve 21 can be closed from the fully open state to a specific opening determined by the IT duty. When the IT duty is 30% or lower, the EGR valve duty can assume values from 100% to 0%, the opening range limits do not exist any longer, and the EGR valve 21 can move freely from the fully open state to the fully closed state.

In the opening range limit maps for the intake throttle valve 23, the EGR valve duty is plotted on the horizontal axis, and the IT duty is plotted on the vertical axis, as shown in FIGS. 4a and 4c. The IT duty is limited to the values that fall within the range shown by the diagonal lines in the graphs in relation to the EGR valve duty. Thus, the operable opening range of the intake throttle valve 23 is limited in accordance with the opening of the EGR valve 21.

When the EGR valve 21 closes at an EGR valve duty of 60% or lower (which corresponds to the third opening of the present invention), the IT valve duty is limited to a value that corresponds to full closure, which ranges from 0% to several percent. In FIG. 3, point B corresponds to an EGR valve duty of 60%. Conversely, the limit is gradually eased at the stage in which the EGR valve duty changes from 60% to 90% (which corresponds to the fourth opening of the present invention). The range of obtainable IT duty proportionally increases, and the intake throttle valve 23 can be closed from the fully open state to a specific opening determined by the EGR valve duty. When the EGR valve duty is 90% or higher, the IT duty can assume values from 0% to nearly 100% (95%), the opening range limits do not exist any longer, and the intake throttle valve 23 can move freely from the fully open state to the fully closed state.

Figure 5:
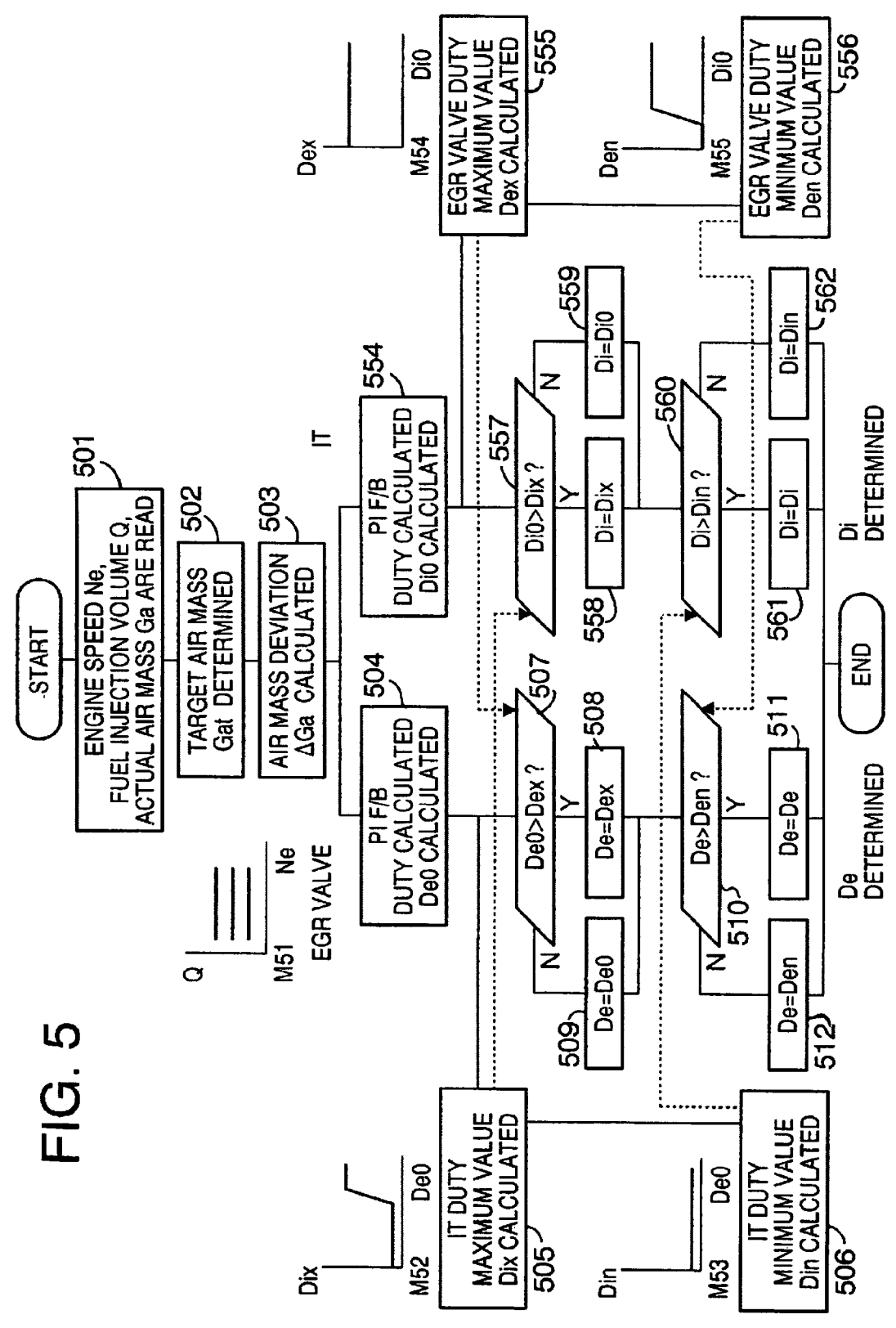

A more detailed description of EGR control will now be given based on the flowchart in FIG. 5. This flow is repeated at specific time intervals (several tens of microseconds) by the ECU 26. Air mass feedback control is provided to the EGR valve 21 and intake throttle valve 23, and both valves are subjected to conventional air mass feedback control (shown in FIG. 8) up to steps 501 to 504 and 554.

Specifically, the actual engine speed Ne, fuel injection volume Q, and air mass volume Ga are first read to the ECU 26 (step 501). The engine speed Ne is the value calculated by the ECU 26 on the basis of the output of the engine revolution sensor, and the fuel injection volume Q is the value of the target fuel injection volume calculated by the ECU 26. The air mass volume Ga (actual air mass volume) is the value calculated by the ECU 26 on the basis of the output of the air mass sensor 17. Next, the target air mass volume Gat is determined according to the map M51 on the basis of the engine speed Ne and fuel injection volume Q (step 502). The map M51 is similar to the map M81 in FIG. 8 in that the air-fuel ratio A/F is calculated from the engine speed Ne and fuel injection volume Q, and the target air mass volume Gat is calculated by the ECU 26 from the air-fuel ratio A/F thus obtained.

Figure 8:
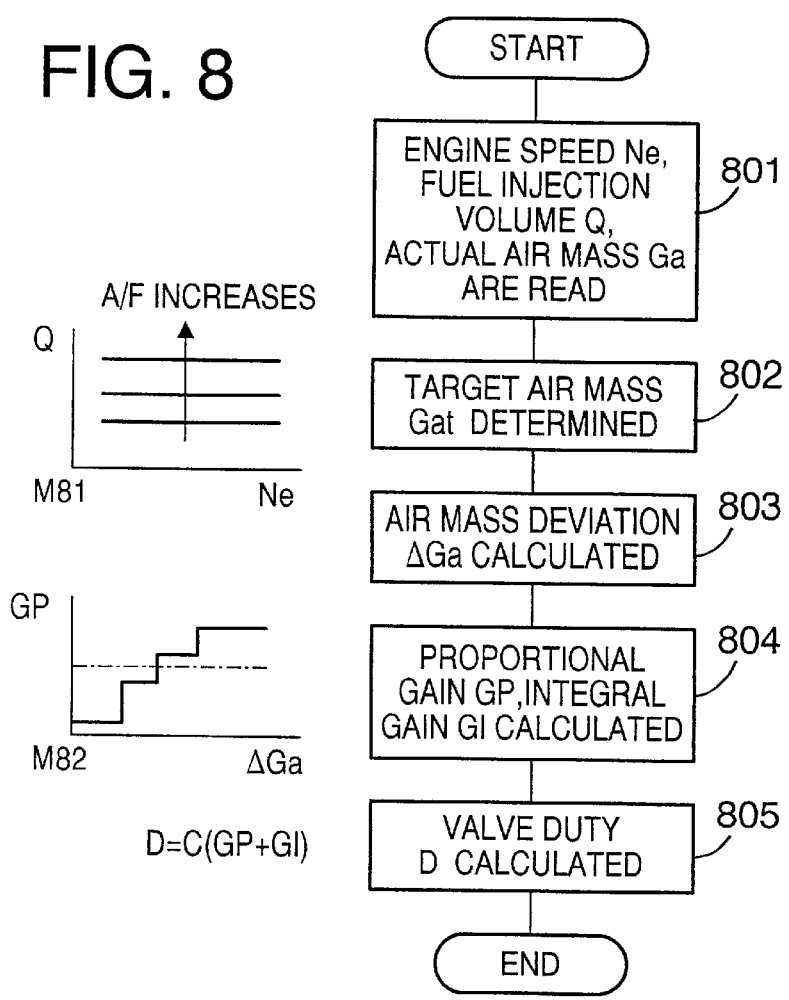
FIG. 8 is a flowchart depicting details of conventional EGR valve feedback control.
Figure 9:
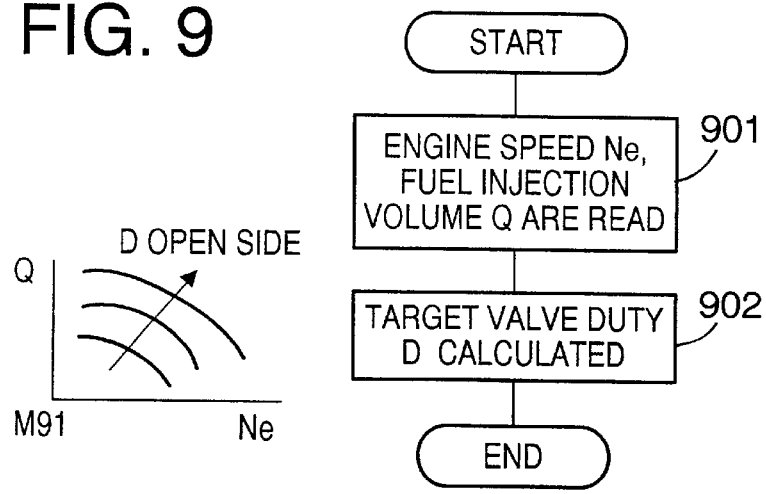
FIG. 9 is a flowchart depicting details of conventional open-loop control for the intake throttle valve.

Deviation ΔGa between the target air mass volume Gat and the actual air mass volume Ga is calculated using the formula ΔGa=Gat−Ga (step 503). The steps are then separated into those for the EGR valve 21 and those for the intake throttle valve 23, and the duties De0 and Di0 for the EGR valve 21 and intake throttle valve 23 are calculated based on the air mass volume deviation ΔGa (steps 504, 554). During these steps, the operations performed during steps 804 and 805 in FIG. 8 are conducted for both valves. More specifically, the proportional gain GP and integral gain GI are calculated from a map similar to the map M82 in FIG. 8, and the duties De0 and Di0 for the two valves are calculated with the aid of the formula D=C (GP+GI) by using the proportional gain GP and the integral gain GI. The target duties De0, Di0 resulting from the feedback are thereby determined. These target duties, however, are tentative values rather than the final target values that are output to the two valves. These values shall be called "feedback duties."

Next, the maximum value Dix and minimum value Din obtainable for the IT duty are determined in accordance with the maps M52, M53 on the basis of the feedback duty De0 for the EGR valve (steps 505, 506). The maps M52, M53 are obtained by extracting only the corresponding maximum and minimum values on the map in FIG. 4c. The obtainable range of the IT duty is thereby determined, and, conversely speaking, the values are limited to that range. In parallel with the above-described operation, the obtainable maximum value Dex and minimum value Den of the EGR valve duty are also determined in the same manner for the intake throttle valve in accordance with the maps M54, M55 on the basis of the feedback duty Di0 for the intake throttle valve (steps 555, 556). The maps M54, M55 are obtained by extracting only the corresponding maximum and minimum values on the map in FIG. 4b. The obtainable range of the EGR valve duty is thereby determined, and, conversely speaking, the values are limited to that range.

Next, the feedback duty De0 for the EGR valve and the predetermined maximum value Dex of the EGR valve duty are compared (step 507). If De0>Dex, it is assumed that De=Dex (step 508), and if De0≦Dex, it is assumed that De=De0 (step 509). De is the final value that is output to the EGR valve 21, but at this stage, the final value is not yet determined, and the upper limit alone is determined. The value De is subsequently compared with the minimum value Den of the predetermined EGR valve duty (step 510). If De>Den, it is assumed that De=De (step 511), and if De≦Den, it is assumed that De=Den (step 512). The lower limit of the EGR valve duty is thus determined, and the final target value De is defined, and so the duty of the final target value De is output to the EGR valve 21, thereby enabling control of the EGR valve 21 in the same manner as above.

A similar procedure is conducted for the intake throttle valve. First, the feedback duty Di0 and the maximum value Dix of the predetermined IT duty are compared (step 557). If Di0>Dix, it is assumed that Di=Dix (step 558), and if Di0≦Dix, it is assumed that Di=Di0 (step 559). Next, this Di and the minimum value Din of the predetermined IT duty are compared (step 560). If Di>Din, it is assumed that Di=Di (step 561), and if Di≦Din, it is assumed that Di=Din (step 562). In this way, the lower limit of the IT duty is determined and the final target value Di is defined, and so the duty of the final target value Di is output to the intake throttle valve 23, thereby enabling control of the intake throttle valve 23 in the same manner as the above.

Figure 6:
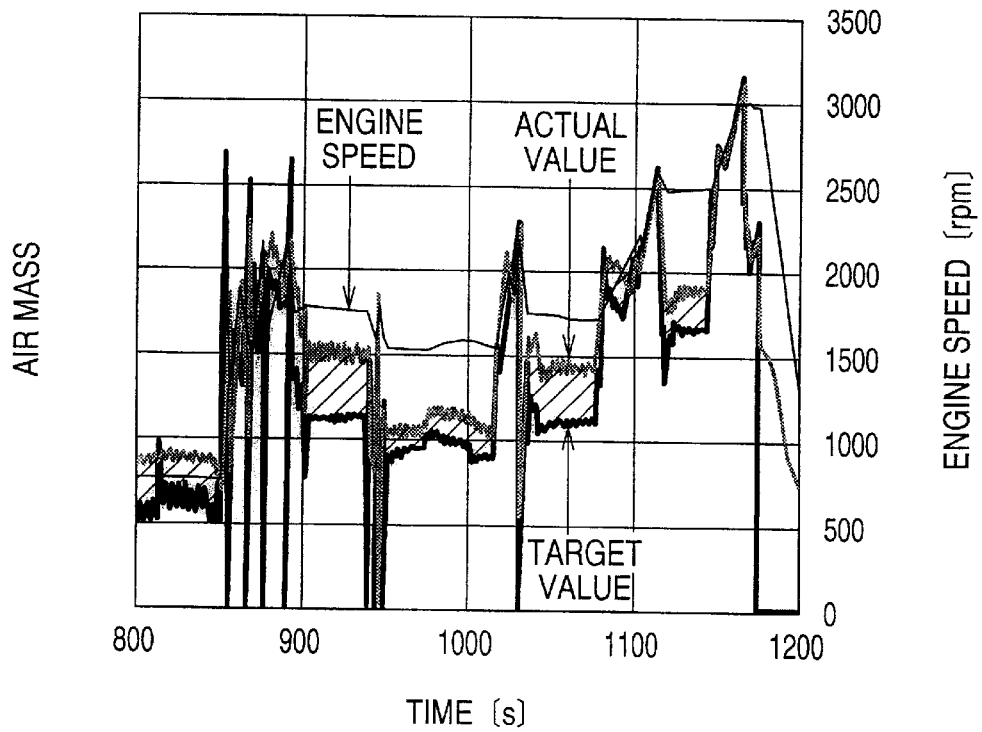
FIG. 6 is a conventional example of the effect verification results relating to EGR control.
Figure 7:
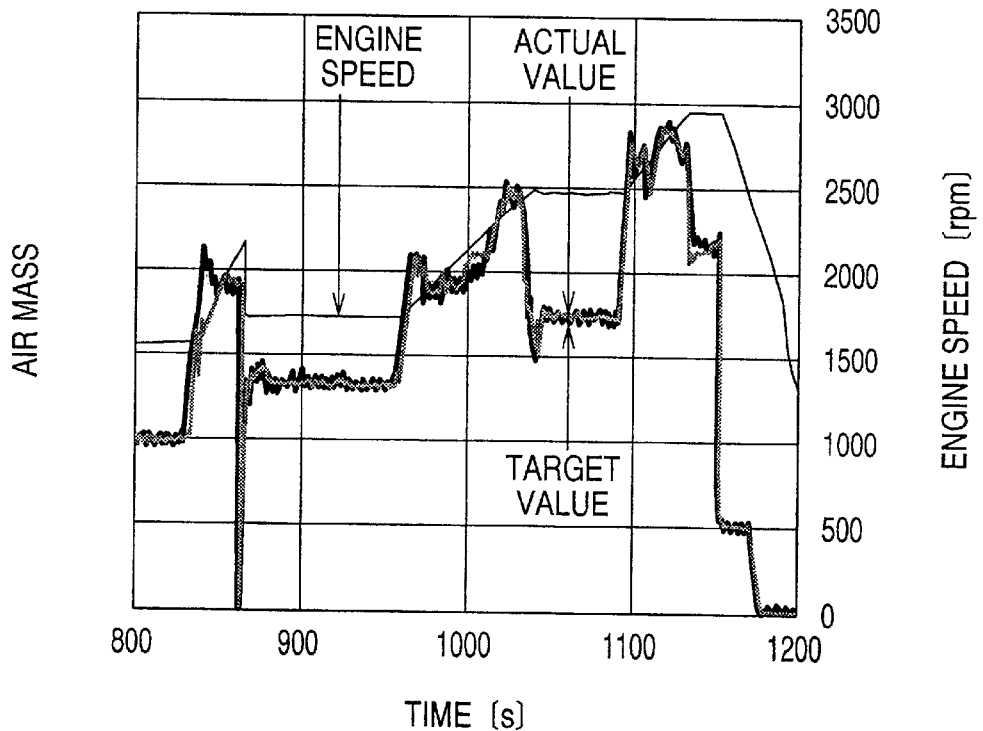
FIG. 7 is a present embodiment example of the effect verification results relating to EGR control.

Verified results of the effects of this control are shown in FIGS. 6 and 7. FIG. 6 is an example of conventional control; that is, an example in which feedback control is provided solely to the EGR valve, and open-loop control is provided to the intake throttle valve. FIG. 7 is an example in which the present control is performed. Both are test results obtained from actual equipment, and the graphs display the engine speed values and the target and actual values of the air mass. Conventionally, trackability of the actual values is poor for the target values of the air mass volume, and the two values deviate from each other, as shown in FIG. 6. With the present control, however, the actual values can be tracked nearly completely with respect to the target values of the air mass volume, and there is substantially no deviation between the two, as shown in FIG. 7. It is thereby confirmed that the present control has excellent results.

In the present apparatus, the operable opening ranges of the EGR valve and intake throttle valve are thus limited in accordance with the target EGR volume (target air mass volume is used as an alternative value thereof in the present embodiment), thereby enabling correlated control of both valves and ensuring adequate controllability, and at the same time enabling smooth switching and preventing switching shock when control is switched from the EGR valve to the intake throttle valve, or vice versa.

The operable opening range of either the EGR valve or the intake throttle valve is limited in accordance with the opening of the other valve; therefore, calibrations of the valves with regard to the target EGR volume can be dispensed with and significant time can be saved in creating maps and making calibrations.

In addition, restrictions are imposed whereby the openings of the two valves can be varied within specific ranges when the target EGR volume falls within a specific range, namely, in the vicinity of the valve control switching point. In other words, both valves can freely operate within the range of these limitations, making it possible to provide smoother switching and to further prevent switching shocks.

In the present embodiment, the ECU 26 comprises the feedback control means, limiting means, and valve opening limiting means of the present invention. The portions of the flowchart in FIG. 5 in which steps 501 to 504 and 554 are conducted constitute the feedback control means, and the portions of the flowchart in which other steps are conducted constitute the limiting means and valve opening limiting means.

Various other embodiments are possible for the present invention. In the present embodiments, for example, the air mass volume was used as an alternative value of the EGR volume, and duty was used as an alternative value of the valve openings, but the EGR volume and valve openings may also be used directly. The present invention is also effective when the duty assigned to a valve is fed back to the valve opening. The present invention is also effective with regard to an engine provided with an intake throttle valve for DPF regeneration or with lean-rich switching for a lean NOx catalyst.

In summary, the present invention displays excellent effects by which adequate controllability is ensured when feedback control is provided to both the EGR valve and the intake throttle valve with regards to the EGR control, and switching shock is prevented when control is switched from one valve to the other valve.

What is claimed is:

1. An EGR control apparatus for an internal combustion engine, comprising:
   an EGR valve provided to an EGR duct for connecting the intake duct and exhaust duct of an engine;
   an intake throttle valve and air mass sensor provided in the intake duct;
   feedback control means for providing feedback control to the EGR valve and intake throttle valve such that the actual air mass volume detected with said air mass sensor approximates the predetermined target air mass volume in accordance with the running condition of the engine; and
   valve opening limiting means for imposing restrictions so that the range of the duty assigned to either the EGR valve or the intake throttle valve is limited by means of a target duty that corresponds to the other valve and is obtained by the feedback, and that the openings of the EGR valve and intake throttle valve can be varied within specific ranges with regard to specific regions in which the valves are fully opened.

2. An EGR control method for an internal combustion engine in which both an EGR valve provided in an EGR duct communicating with the intake duct of the engine and an intake throttle valve provided in the intake duct undergo feedback control such that the actual EGR volume approximates the target EGR volume corresponding to the running condition of the engine, wherein the operable opening range of one of the EGR valve and the intake throttle valve is limited in accordance with the target opening of the other valve obtained by the feedback.

3. The EGR control method for an internal combustion engine according to claim 2, wherein the openings of the EGR valve and intake throttle valve are variable within specific opening ranges when the target EGR volume falls within a specific range.

4. An EGR control apparatus for an internal combustion engine, comprising:
   an EGR valve provided to an EGR duct for connecting the intake duct and exhaust duct of an engine;
   an intake throttle valve provided to the intake duct;
   feedback control means for providing feedback control to the EGR valve and intake throttle valve such that the actual EGR volume approximates the target EGR volume corresponding to the running condition of the engine; and
   limiting means for limiting the operable opening ranges of the EGR valve and intake throttle valve in accordance with the target EGR volume.

5. The EGR control apparatus for an internal combustion engine according to claim 1, wherein duty control is provided to the EGR valve and intake throttle valve, and the openings of the EGR valve and intake throttle valve are replaced with the duty values of the duty signals assigned thereto.

6. The EGR control apparatus for an internal combustion engine according to claim 1, wherein the value of the EGR volume is replaced with the value of the intake air volume entering the intake duct, means of detecting the intake air volume is provided in the intake duct for the purpose of detecting the actual intake air volume, and a feedback control means determines the target opening of the EGR valve as well as intake throttle valve on the basis of the deviation between the actual intake air volume and the target intake air volume.

7. The EGR control apparatus for an internal combustion engine according to claim 6, wherein duty control is provided to the EGR valve and intake throttle valve, and the openings of the EGR valve and intake throttle valve are replaced with the duty values of the duty signals assigned thereto.

8. The EGR control apparatus for an internal combustion engine according to claim 1, wherein the limiting means imposes restrictions so that the openings of the EGR valve and intake throttle valve are variable within specific opening ranges when the target EGR volume falls within a specific range.

9. The EGR control apparatus for an internal combustion engine according to claim 8, wherein the limiting means limits the operable opening range of either the EGR valve or the intake throttle valve in accordance with the target opening of the other valve obtained by the feedback.

10. The EGR control apparatus for an internal combustion engine according to claim 8, wherein the value of the EGR volume is replaced with the value of the intake air volume entering the intake duct, means of detecting the intake air volume is provided in the intake duct for the purpose of detecting the actual intake air volume, and a feedback control means determines the target opening of the EGR valve as well as intake throttle valve on the basis of the deviation between the actual intake air volume and the target intake air volume.

11. The EGR control apparatus for an internal combustion engine according to claim 8, wherein duty control is provided to the EGR valve and intake throttle valve, and the openings of the EGR valve and intake throttle valve are replaced with the duty values of the duty signals assigned thereto.

12. The EGR control apparatus for an internal combustion engine according to claim 1, wherein the limiting means limits the operable opening range of either the EGR valve or the intake throttle valve in accordance with the target opening of the other valve obtained by the feedback.

13. The EGR control apparatus for an internal combustion engine according to claim 12, wherein the value of the EGR volume is replaced with the value of the intake air volume entering the intake duct, means of detecting the intake air volume is provided in the intake duct for the purpose of detecting the actual intake air volume, and a feedback control means determines the target opening of the EGR valve as well as intake throttle valve on the basis of the deviation between the actual intake air volume and the target intake air volume.

14. The EGR control apparatus for an internal combustion engine according to claim 12, wherein duty control is provided to the EGR valve and intake throttle valve, and the openings of the EGR valve and intake throttle valve are replaced with the duty values of the duty signals assigned thereto.

15. The EGR control apparatus for an internal combustion engine according to claim 3, wherein the limiting means determines the operable opening ranges of the EGR valve and intake throttle valve in accordance with specific maps.

16. The EGR control apparatus for an internal combustion engine according to claim 15, wherein the limiting means imposes restrictions so that the EGR valve remains fully opened when the target opening of the intake throttle valve is equal to or less than a first opening, the EGR valve is operable from the point where the valve is fully opened to the opening where the valve closes as the target opening increases, when the target opening is greater than the first opening but is equal to or less than a second opening, and the EGR valve is operable from the point where the valve is fully opened to the point where the valve is fully closed when the target opening is greater than the second opening; and that the intake throttle valve remains fully opened when the target opening of the EGR valve is equal to or less than a third opening, the intake throttle valve is operable from the point where the intake throttle valve is fully opened to the opening where the intake throttle valve closes as the target opening increases, when the target opening is greater than the third opening but is equal to or less than a fourth opening, and the intake throttle valve is operable from the point where the valve is fully opened to the point where the valve is fully closed when the target opening is greater than the fourth opening.

17. The EGR control apparatus for an internal combustion engine according to claim 15, wherein the value of the EGR volume is replaced with the value of the intake air volume entering the intake duct, means of detecting the intake air volume is provided in the intake duct for the purpose of detecting the actual intake air volume, and a feedback control means determines the target opening of the EGR valve as well as intake throttle valve on the basis of the deviation between the actual intake air volume and the target intake air volume.

18. The EGR control apparatus for an internal combustion engine according to claim 15, wherein duty control is provided to the EGR valve and intake throttle valve, and the openings of the EGR valve and intake throttle valve are replaced with the duty values of the duty signals assigned thereto.

19. The EGR control apparatus for an internal combustion engine according to claim 3, wherein the limiting means imposes restrictions so that the EGR valve remains fully opened when the target opening of the intake throttle valve is equal to or less than a first opening, the EGR valve is operable from the point where the valve is fully opened to the opening where the valve closes as the target opening increases, when the target opening is greater than the first opening but is equal to or less than a second opening, and the EGR valve is operable from the point where the valve is fully opened to the point where the valve is fully closed when the target opening is greater than the second opening; and that the intake throttle valve remains fully opened when the target opening of the EGR valve is equal to or less than a third opening, the intake throttle valve is operable from the point where the intake throttle valve is fully opened to the opening where the intake throttle valve closes as the target opening increases, when the target opening is greater than the third opening but is equal to or less than a fourth opening, and the intake throttle valve is operable from the point where the valve is fully opened to the point where the valve is fully closed when the target opening is greater than the fourth opening.

20. The EGR control apparatus for an internal combustion engine according to claim 19, wherein duty control is provided to the EGR valve and intake throttle valve, and the openings of the EGR valve and intake throttle valve are replaced with the duty values of the duty signals assigned thereto.

21. The EGR control apparatus for an internal combustion engine according to claim 19, wherein the value of the EGR volume is replaced with the value of the intake air volume entering the intake duct, means of detecting the intake air volume is provided in the intake duct for the purpose of detecting the actual intake air volume, and a feedback control means determines the target opening of the EGR valve as well as intake throttle valve on the basis of the deviation between the actual intake air volume and the target intake air volume.

* * * * *